Patented Sept. 17, 1946

2,407,726

UNITED STATES PATENT OFFICE 2,407,726

METHODS OF PREPARING CHEMICAL PRODUCTS

Lee Irvin Smith, Minneapolis, Minn., and William B. Renfrow, Jr., Charlotte, N. C., assignors to Regents of the University of Minnesota, Minneapolis, Minn., a corporation of Minnesota No Drawing. Application August 7, 1941, Serial No. 405,796

7 Claims. (Cl. 260—333)

The present invention relates to derivatives of the tocopherols and related substances and to the method of preparing such derivatives.

Contemporary advances in the knowledge of nutrition and medicine in the medical and veterinary fields have developed the importance of substances having biological activity. Substances designated as the "tocopherols" have been shown to be the primary compounds exhibiting vitamin E activity and much work has been carried out to increase the knowledge concerning these compounds for clinical and veterinary uses. To accelerate the accumulation of this knowledge, standard test conditions have been established to evaluate the comparative strengths or potencies of test materials by the use of "standard" animals, usually white rats. It has been established that results thus obtained on "standard" test animals may normally be projected and applied to other mammals and to human beings by the application of factors established by clinical tests relating to compositions other than those exhibiting vitamin E activity.

Extended clinical tests on human beings require relatively long periods of time and therefore the mode of utilization of any medical or dietary improvement, whether in the vitamin field or in other medical or dietary fields, may be developed only after years of study; but this does not preclude valuable utilization of specific materials such as the tocopherols and their derivatives within the purview of available information. Therefore, it is logical and proper that considerable weight be given to findings developed in the tests with "standardized" test animals.

Co-pending application Serial No. 211,077, Patent 2,249,054, and other applications, describe processes for synthesizing tocopherols. A further invention, as described in this application, resides in the process for making stable and useful derivatives of the tocopherols.

It is an object of the invention to prepare derivatives of the tocopherols, which derivatives retain the biological activity of the primary tocopherol itself, and yet assume various desirable physical characteristics which assist in utilization of the compositions.

A further object is to prepare a non-toxic reaction product which is suitable for clinical use and has vitamin E activity substantially equivalent to the α-tocopherol content, on the molecular basis, but which has modified chemical and physical properties, particularly that of being a solid rather than a liquid.

A further object is to provide a process for preparing di-basic acid anhydride reaction products of the tocopherols.

More specifically, one object is to prepare a calcium salt of the acid succinate of α-tocopherol.

A polybasic anhydride is required in the present invention so as to furnish, after the first reaction, an acid group capable of reaction with a metal ion to form a salt.

In this present invention, it has been found that the desired compound can be prepared by first proceeding through an intermediate step, by treating a selected tocopherol with a Grignard reagent such as methyl, ethyl or isopropyl magnesium iodide, bromide or chloride. The alkyl group of the Grignard reagent is preferably chosen so that the alkane subsequently generated in the reaction will be volatilized at the temperatures used, and therefore readily separated. Thus, where the methyl Grignard reagent is used, methane is liberated; similarly, where the ethyl Grignard is used, ethane is liberated. If the hydrocarbon liberated is not readily volatilized, it may nevertheless be separated by use of appropriate procedures.

After reaction of the tocopherol with the Grignard reagent, the reaction product is treated with the anhydride of the polybasic acid, which reacts with the halo-magnesium derivative of the tocopherol to thus form an ester salt. Thus, succinic anhydride reacts with the halo-magnesium derivative of the tocopherol, inserting itself between the magnesium halide and the oxygen to which it is attached. By acidifying this product, a free acid having one acid group of the starting di-basic acid esterified with the tocopherol is formed in place of the magnesium halide. The free acid having one group esterified with the selected tocopherol, other hydroxy chroman or hydroxy coumaran, is a new and useful intermediate which may be used for the formation of a wide variety of further compounds. Thus, it may be reacted with alkali metal salts or bases to form an ester salt of the polybasic acid, in which one acid group has been esterified with tocopherol, and the other converted to a salt.

This invention is illustrated by the following example which, however, must not be taken as any limitation upon the invention described and claimed.

Example

α-tocopherol (4.91 g.) was dissolved in ethyl ether (50 cc.) and a 5% excess, based on the tocopherol, of propyl magnesium chloride in ethyl ether (5.8 cc., 2.06 N.) was added. After thorough mixing of the foregoing reaction mixture, at room temperature, a solution of succinic anhydride (1.14 g., 10% excess) in dioxane (10 cc.) was added and the flask rinsed with an additional 10 cc. of dioxane. The reaction mixture was then stoppered and allowed to stand overnight at room temperature, after which it was heated on a steam bath for four hours. It was then poured into water, the reaction mixture acidified with dilute hydrochloric acid, extracted with ethyl ether and the ether solution dried, by introducing thereinto a solid drying agent. The solution was then filtered to remove the drying agent and the ether evaporated from the filtrate.

There remained 5.88 grams (97.2% yield) of the acid succinate of α-tocopherol.

This was then dissolved in methanol (25 cc.) and concentrated ammonia (1 cc.) was added, followed by the addition of a solution of calcium chloride in methanol (13 cc., 10%, 100% excess). A voluminous precipitate formed. The mixture was thoroughly stirred for ten minutes and more concentrated ammonia (3 cc.) added. After further stirring, the precipitate was allowed to settle, the liquid decanted off and the precipitate washed with acetone. The solid is dried for a short time at 100° C. in a vacuum, after which it was dissolved in hot dioxane (100 cc.) and reprecipitated by pouring the solution into water (150 cc.). The liquid was decanted off, the solid washed with acetone and dried in a vacuum desiccator. The solid was dissolved in a minimum amount of hot dioxane and the hot solution filtered, after which the filtrate was cooled. A voluminous precipitate formed. Two volumes of acetone were then added, mixed thoroughly and the liquid decanted off. The solid remaining after decanting was washed with acetone and dried for a short time in a vacuum at 100° C., dissolved again in a minimum amount of hot dioxane and allowed to crystallize from the cooled liquid. The solid was then washed with acetone and dried at 100° C. under reduced pressure. It weighed 44 grams (71% yield) and melted at 214–215° C.

The product is a white solid, readily soluble in ethyl ether and ligroin; moderately soluble in alcohol; soluble in hot dioxane and sparingly soluble in cold dioxane; insoluble in water and acetone. Combustion analysis shows good correlation between theoretical and observed analysis, as shown in the following table:

|  | Carbon | Hydrogen | Calcium |
| --- | --- | --- | --- |
|  | Per cent | Per cent | Per cent |
| Calculated for $(C_{33}H_{53}O_5)_2Ca$ | 72.10 | 9.75 | 3.64 |
| Found | 72.27 | 9.70 | 3.37 |

Rigorously conducted vitamin E assays with "standard" test animals shows that the compound is fully equivalent to α-tocopherol on a molecular basis, and the compound is effective in increasing reproduction when used as a dietary supplement in the food mixtures fed to fowls such as chickens, ducks, turkeys and the like and food mixtures for fur bearing animals such as foxes and mink. For such uses, the calcium succinate salt of tocopherol is especially desirable in that it is stable in air, soluble in fats and insoluble in water.

Other metallic salts of any of the metals may be prepared in an analogous fashion by neutralizing the polybasic acid ester of the selected tocopherol by the appropriate metal base or by treating the ester with selected salts of appropriate metals. Where the finished product is used for medical or dietary purposes, the metal selected for formation of the salt is, of course, non-toxic. For other purposes where the matter of toxicity is unimportant, other metals may be used.

The sodium salt so prepared is a slightly hygroscopic solid that lathers when shaken with water but is only very slightly soluble in water. The salts of ammonium, potassium, and chloromagnesium yield oils by a similar process. The barium salt is a solid.

Maleic anhydride, phthalic anhydride, and glutaric anhydride form derivatives that closely resemble in physical properties the derivative from succinic acid.

The invention is applicable to such raw materials as the natural α-, β- or gamma-tocopherols, or to synthesized α-tocopherol or xylol tocopherols, or to other hydroxy chromans or hydroxy coumarans and similar compounds.

Many obvious variations may be made in the invention herein illustrated and described without departing from the spirit of the invention claimed.

We claim:

1. The process comprising reacting a compound selected from the group consisting of hydroxy chromans and hydroxy coumarans with a Grignard reagent, reacting the resultant mixture with a polybasic acid anhydride, and acidifying the reaction mixture.

2. The process comprising reacting compound selected from the group consisting of hydroxy chromans and hydroxy coumarans with a Grignard reagent, reacting the resultant mixture with a polybasic acid anhydride, acidifying the reaction mixture, and recovering the acid polyhydric acid ester of the selected starting material.

3. The process comprising reacting a compound selected from the group consisting of hydroxy chromans, and hydroxy coumarans with a Grignard reagent, reacting the resultant mixture with a polybasic acid anhydride, acidifying the reaction mixture, and reacting the acidified product with a metallic base.

4. The process comprising reacting a compound selected from the group consisting of hydroxy chromans, and hydroxy coumarans with a Grignard reagent, reacting the resultant mixture with a polybasic acid anhydride, acidifying the reaction mixture, reacting the acidified product with a metallic base, and recovering the salt of the acid polyhydric acid ester of the selected starting material.

5. The process comprising reacting a tocopherol with a Grignard reagent, reacting the resultant mixture with succinic anhydride, and acidifying to form the acid succinate of the tocopherol.

6. The process comprising reacting a tocopherol with a Grignard reagent, reacting the resultant mixture with succinic ahydride, acidifying, and reacting the resultant product with a compound presenting an available reactive calcium ion, to form the calcium salt of the acid succinate of the tocopherol.

7. The process comprising reacting α-tocopherol with an alkyl magnesium halide wherein the alkyl group corresponds to an easily volatilized alkane, reacting the resultant mixture with succinic anhydride, acidifying the mixture, and reacting the resultant acid succinate ester of α-tocopherol with calcium halide under alkaline conditions to form the corresponding calcium salt of the acid succinate of α-tocopherol.

LEE IRVIN SMITH.
WILLIAM B. RENFROW, Jr.